US010782834B2

(12) United States Patent
Chen et al.

(10) Patent No.: US 10,782,834 B2
(45) Date of Patent: Sep. 22, 2020

(54) TOUCH DISPLAY DEVICE HAVING ELECTROSTATIC DISCHARGE LAYER

(71) Applicant: Innolux Corporation, Miao-Li County (TW)

(72) Inventors: Huei-Ying Chen, Miao-Li County (TW); Wen-Ping Yang, Miao-Li County (TW); Chu-Hung Tsai, Miao-Li County (TW); Li-Wei Sung, Miao-Li County (TW); Kuo-Shun Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/286,688

(22) Filed: Feb. 27, 2019

(65) Prior Publication Data
US 2019/0302921 A1  Oct. 3, 2019

(30) Foreign Application Priority Data

Mar. 27, 2018  (CN) .......................... 2018 1 0258342

(51) Int. Cl.
*G06F 3/041* (2006.01)
*G06F 3/044* (2006.01)
(52) U.S. Cl.
CPC .... *G06F 3/044* (2013.01); *G06F 2203/04103* (2013.01); *G06F 2203/04107* (2013.01)
(58) Field of Classification Search
CPC ...................... G06F 2203/04103–04113; G06F 3/041–0428; G06F 3/0488–04886
See application file for complete search history.

(56) References Cited

U.S. PATENT DOCUMENTS

| 2009/0108738 | A1* | 4/2009 | Kwak ................. G09G 3/3208 313/504 |
| 2009/0161285 | A1* | 6/2009 | Abouaf ................. H02N 13/00 361/234 |
| 2011/0228189 | A1* | 9/2011 | Oh ....................... G02F 1/13338 349/43 |

(Continued)

FOREIGN PATENT DOCUMENTS

CN          103294294 A       9/2013

*Primary Examiner* — Sanghyuk Park
(74) *Attorney, Agent, or Firm* — McClure, Qualey & Rodack, LLP

(57) ABSTRACT

A touch display device includes a first substrate, a touch electrode, a dummy electrode, a first dielectric layer and an electrostatic discharge layer. The touch electrode is disposed on the first substrate; the touch electrode includes a driving electrode and a sensing electrode, wherein the driving electrode is disposed adjacent to the sensing electrode. The dummy electrode is disposed on the first substrate and adjacent to at least one of the driving electrode and the sensing electrode, and two of the dummy electrode, the driving electrode and the sensing electrode are separated from each other. The first dielectric layer is disposed on the touch electrode and the dummy electrode, and the first dielectric layer has at least one first through hole disposed corresponding to the dummy electrode. The electrostatic discharge layer is disposed on the first dielectric layer and contacts with the dummy electrode through the first through hole.

15 Claims, 11 Drawing Sheets

(56) References Cited

U.S. PATENT DOCUMENTS

| | | | | |
|---|---|---|---|---|
| 2014/0055383 A1* | 2/2014 | Kim | ................ | G06F 3/041 |
| | | | | 345/173 |
| 2014/0240889 A1* | 8/2014 | Zheng | ................ | H01L 27/0288 |
| | | | | 361/220 |
| 2015/0309625 A1* | 10/2015 | Huang | ................ | H05K 1/0259 |
| | | | | 345/174 |
| 2017/0121565 A1* | 5/2017 | Yasui | ................ | G02B 1/16 |
| 2018/0252955 A1* | 9/2018 | Kurasawa | ............ | G06F 3/0412 |

* cited by examiner

TOUCH DISPLAY DEVICE HAVING ELECTROSTATIC DISCHARGE LAYER

This application claims the benefit of People's Republic of China application Serial No. 201810258342.1, filed Mar. 27, 2018, the subject matter of which is incorporated herein by reference.

BACKGROUND

Technical Field

This disclosure relates to a touch display device, and more particularly to a touch display device having a good touch sensing function or a good display quality.

Description of the Related Art

A conductive pattern of a capacitive touch sensing element has the transparent or conductive properties. A touch capacitance may be generated between the driving electrode (Tx) and the sensing electrode (Rx) of the touch conductive pattern, and the spaces between the driving electrodes and the sensing electrodes may be designed to decrease the touch capacitance, and the loading of the resistor-capacitor (RC) of the touch circuit can be reduced. However, the conductive layer is not disposed corresponding to the spaces, so the optical visibility of the touch conductive pattern and the optical visibility of the space may be difference. In order to reduce the optical visibility difference, dummy electrodes (dummy conductive electrodes) may be disposed corresponding to the spaces between the driving electrodes and the sensing electrodes to reduce the optical visibility difference.

However, the potential of the dummy electrode is in the floating state, the dummy electrode is not coupled to the ground or another external circuit having a potential, so the charges may be accumulated at the dummy electrode. If the accumulated charges cannot be discharged, the accumulated residual electrostatic charges may be generated. In some embodiment, the time for discharging the accumulated residual charges may be at least ten minutes or greater than one day, or the accumulated charges may affect the touch function, or cause the bad influence on the display quality.

SUMMARY

This disclosure discloses a touch display device. The touch display device includes a first substrate, a touch electrode, a dummy electrode, a first dielectric layer and an electrostatic discharge layer. The touch electrode is disposed on the first substrate; the touch electrode includes a driving electrode and a sensing electrode, wherein the driving electrode is disposed adjacent to the sensing electrode. The dummy electrode is disposed on the first substrate and adjacent to at least one of the driving electrode and the sensing electrode, and two of the dummy electrode, the driving electrode and the sensing electrode are separated from each other. The first dielectric layer is disposed on the touch electrode and the dummy electrode, and the first dielectric layer has at least one first through hole disposed corresponding to the dummy electrode. The electrostatic discharge layer is disposed on the first dielectric layer and contacts with the dummy electrode through the first through hole.

This disclosure discloses another touch display device. The touch display device includes a first substrate, a touch electrode, a dummy electrode and an electrostatic discharge layer. The touch electrode is disposed on the first substrate, and the touch electrode includes a driving electrode and a sensing electrode, wherein the driving electrode is disposed adjacent to the sensing electrode. The dummy electrode is disposed on the first substrate and disposed adjacent to at least one of the driving electrode and the sensing electrode, and two of the dummy electrode, the driving electrode and the sensing electrode are separated from each other. The electrostatic discharge layer is disposed on the dummy electrode and contact s with the dummy electrode.

The above and other aspects of the disclosure will become better understood with regard to the following detailed description of the preferred but non-limiting embodiments. The following description is made with reference to the accompanying drawings.

DETAILED DESCRIPTION

Figure 1:
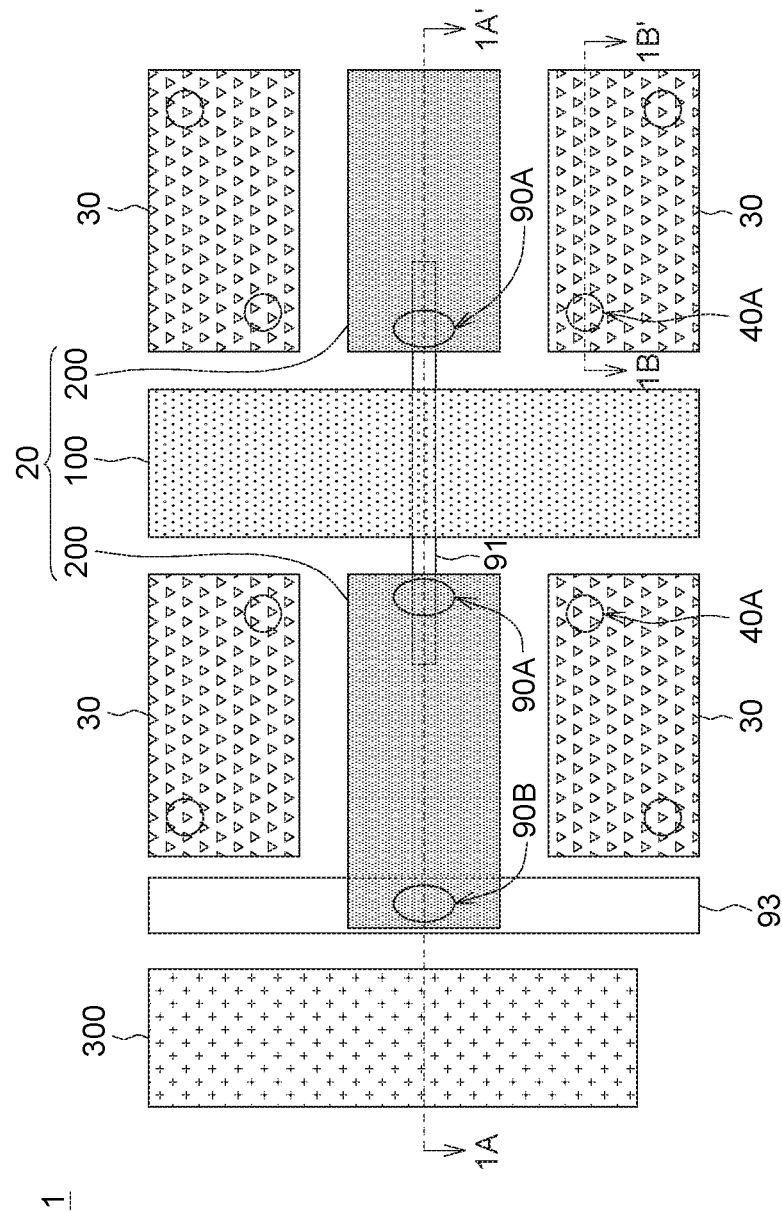
FIG. 1 is a top view showing a touch display device according to an embodiment of this disclosure.

Embodiments of this disclosure will be described in detail with reference to the accompanying drawings. The same reference numerals in the drawings are used to indicate the same or similar parts. It should be noted that the drawings have been simplified to clearly illustrate the contents of the embodiments, and that the detailed structures and manufacturing steps of the components proposed in the embodiments are merely illustrative, and are not intended to limit the scope of this disclosure. Those skilled in the art may modify or change the structures and steps according to the needs of the actual implementation. The size, thickness or external shape of any one of the structures or elements in the drawings is merely illustrative and is not intended to limit the scope of this disclosure.

Furthermore, the condition when a first material layer is disposed on or over a second material layer includes the direct contact between the first material layer and the second material layer. Alternatively, it is also possible to have one or more layers of other materials interposed, in which case there may be no direct contact between the first material layer and the second material layer.

In some embodiments of this disclosure, terms relating to joining and electrical connection may mean that two structures are in direct contact unless specifically defined, or that two structures are not in direct contact, wherein other structures are provided between the two structures. The term "joining" and "electrical connection" may also include the case where two structures are movable or two structures are fixed.

Furthermore, all or part of the technical features in one or more embodiments of this disclosure may be substituted and/or combined with all or part of the technical features of the other one or more embodiments of this disclosure to derive a further one or more embodiments of this disclosure.

Figure 2:
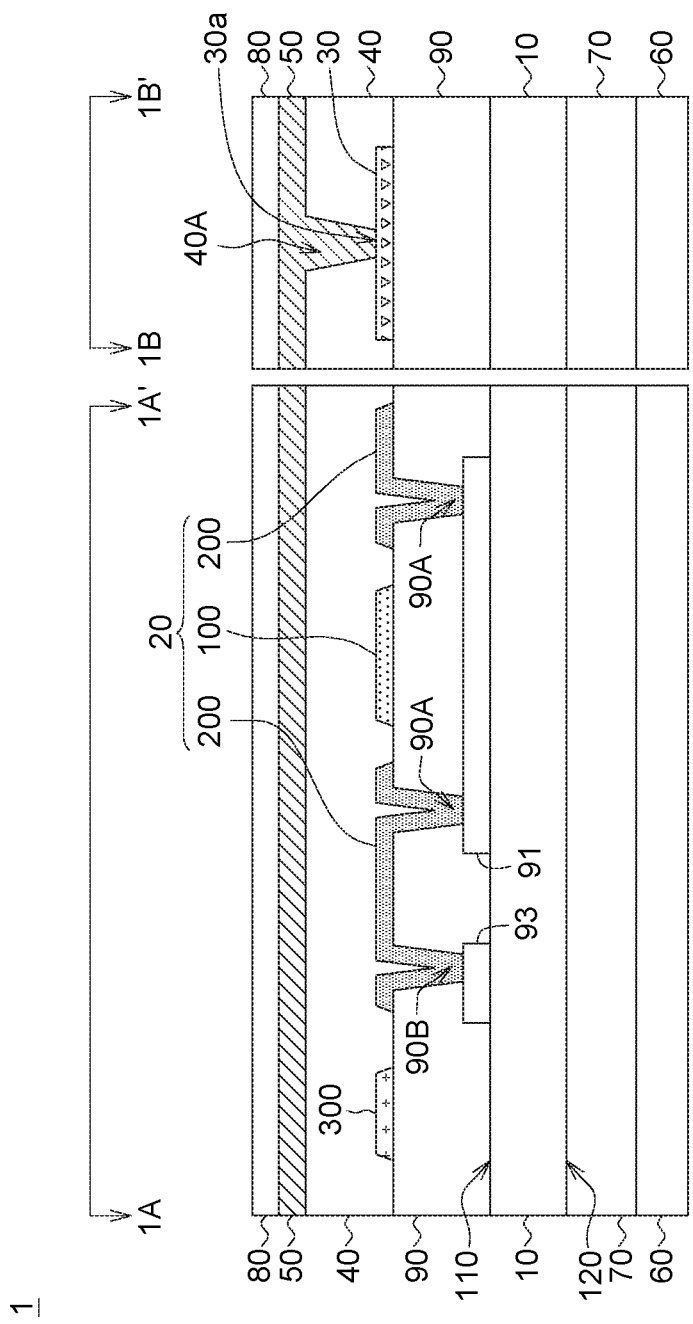
FIG. 2 is a cross-sectional view showing a touch display device according to an embodiment of this disclosure.

FIG. 1 is a top view showing a touch display device according to an embodiment of this disclosure. FIG. 2 is a cross-sectional view showing a touch display device according to an embodiment. FIG. 2 shows the cross-sectional structure taken along a cross-sectional line 1A-1A' and a cross-sectional line 1B-1$i$ B' of FIG. 1. Referring to FIGS. 1 to 2, a touch display device 1 includes a first substrate 10, a touch electrode 20, a dummy electrode 30, a first dielectric layer 40 and an electrostatic discharge layer 50. The touch electrode 20 includes a driving electrode 100 and a sensing electrode 200 disposed on the first substrate 10, wherein the driving electrode 100 is disposed adjacent to the sensing electrode 200. In other embodiments, a plurality of sensing electrodes 200 may be disposed adjacent to the driving electrode 100, but it is not restricted thereto. The dummy electrode 30 is disposed on the first substrate 10, the dummy electrode 30 is disposed adjacent to at least one of the driving electrodes 100, at least one of the sensing electrodes 200, or the dummy electrode 30 is disposed between the driving electrode 100 and the sensing electrode 200. In some embodiments, the dummy electrode 30, the driving electrode 100 and the sensing electrode 200 do not overlap with each other in a normal direction of the first substrate 10, and a gap is formed between the dummy electrode 30 and the touch electrode 20 (including the driving electrode 100 and the sensing electrode 200), and the dummy electrode 30 and the touch electrode 20 are substantially electrically insulated from each other. In some embodiments, the first dielectric layer 40 may be disposed on the touch electrode 20 and the dummy electrode 30, and the first dielectric layer 40 may have at least one first through hole 40A, at least one first through hole 40A may be disposed corresponding to the dummy electrode 30. In some embodiments, the electrostatic discharge layer 50 may be disposed on the first dielectric layer 40, and the electrostatic discharge layer 50 contacts with the dummy electrode 30 through the first through hole 40A. A sheet resistance of the electrostatic discharge layer 50 may be in a range from $1.0 \times 10^8$ Ohms/unit area to $1.0 \times 10^{11}$ Ohms/unit area ($1.0 \times 10^8$ Ohms/unit area≤sheet resistance≤$1.0 \times 10^{11}$ Ohms/unit area), but it is not restricted thereto.

According to the embodiment, the sheet resistance of the electrostatic discharge layer 50 may be in a range from $1.0 \times 10^8$ Ohms/unit area to $1.0 \times 10^{11}$ Ohms/unit area, which may increase the discharging of charges at the dummy electrode 30, abnormal electric fields caused by the accumulated charges can be reduced, or some display error conditions caused by the abnormal electric fields can be reduced. In some embodiments, the touch display device is a liquid crystal touch display device, charges accumulated at the dummy electrode 30 may cause abnormal turning or reversal of liquid crystal molecules, or even the unexpected dark state or light-leakage phenomenon may occur. The electrostatic discharge layer 50 can reduce the influence or interference on the touch function or sensitivity of the touch electrode 20, the influence or interference on the touch function or sensitivity of the touch electrode 20 may be caused by the accumulation of charges at the dummy electrode 30.

In some embodiments, the sheet resistance of the electrostatic discharge layer 50 is less than $1.0 \times 10^8$ Ohms/unit area, the electrostatic discharge layer 50 may have the higher conductive property, which may generate the shielding effect of the touch electric field, so it is difficult to transmit signals of the touch electrode 20 to the outside, thereby affecting the touch function, or the serious touch failure tends to occur. In some embodiments, the sheet resistance of the electrostatic discharge layer 50 is greater than $1.0 \times 10^{11}$ Ohms/unit area, the electrostatic discharge layer 50 may have the lower conductive property, which is difficult to discharge the charges, the abnormal charge accumulation may occur, so that the abnormal touch signal may cause mis-judgement, or the unexpected serious electrostatic discharge (ESD) may occur to cause the electrostatic damage in the touch circuit to destroy the circuit structure. Therefore, the sheet resistance of the electrostatic discharge layer 50 may be designed to in a range from $1.0 \times 10^8$ Ohms/unit area to $1.0 \times 10^{11}$ Ohms/unit area ($1.0 \times 10^8$ Ohms/unit area≤sheet resistance≤$1.0 \times 10^{11}$ Ohms/unit area), the ability of discharging the charges on the dummy electrode may be increased, or the touch sensing function or the display quality may be increased.

In some embodiments, a thickness of the first dielectric layer 40 may approximately in a range from 700 angstroms (Å) to 6 microns (μm) (700 angstroms≤thickness≤6 microns) the thickness of the electrostatic discharge layer 50 may approximately in a range from 100 angstroms (Å) to 30 microns (μm) (100 angstroms≤thickness≤30 microns). In some embodiments, the thickness of the first dielectric layer 40 may approximately in a range from 700 angstroms (Å) to 3 microns (μm) (700 angstroms≤thickness≤3 microns), and the thickness of the electrostatic discharge layer 50 may approximately in a range from 5 microns (μm) to 20 microns (μm) (5 microns≤thickness 20 microns), but it is not restricted thereto.

In this embodiment, the dummy electrode 30 may have the floating potential, but it is not restricted thereto. In some embodiments, an area of the driving electrode 100 or an area of the sensing electrode 200 on the first substrate compared with an area of the dummy electrode 30, the area of the dummy electrode 30 may be greater than 30% of the total electrode area (including the driving electrode 100, the sensing electrode 200 and the dummy electrode 30). In some embodiments, the total electrode area occupied by the dummy electrode 30 on the first substrate may be greater than or equal to 60%, but it is not restricted thereto. In some embodiments, the outline (or dimension) of the driving electrode 100, the outline (or dimension) of the sensing electrode 200 or the outline (or dimension) of the dummy electrode 30 may be adjusted according to the condition, such as a rhombus, a comb shape, a polygon, an arc, other irregular shapes, or a combination thereof. This disclosure only provides several embodiments, but is not restricted thereto.

In some embodiments, as shown in FIG. 2, the first dielectric layer 40 may have at least a first through hole 40A. The first through hole 40A may correspond to the dummy electrode 30 and exposes a portion of the dummy electrode 30. An electrostatic discharge layer may contact with the dummy electrode 30 through the first through hole 40A. Specifically, a portion of the electrostatic discharge layer 50 may be filled into (or disposed into) the first through hole 40A to contact the dummy electrode 30. The electrostatic discharge layer 50 in contact with the dummy electrode 30 can discharge the charges accumulated at the dummy electrode 30 to the outside through the electrostatic discharge layer 50, or the discharge time can be shorter than 0.1 second or even shorter time to increase the touch sensing function or increase the display quality. In some embodiments, the first dielectric layer 40 corresponding to the top of the dummy electrode 30 may have more first through holes 40A, the electrostatic discharge layer 50 may contact with the dummy electrode 30 through multiple first through holes 40A, but it is not restricted thereto.

In some embodiments, as shown in FIG. 2, the dummy electrode 30, the driving electrode 100 and/or the sensing electrode 200 may be made of the same conductive layer. In other embodiments, the dummy electrode 30, the driving electrode 100 and/or the sensing electrode 200 may be made of different conductive layers, but it is not restricted thereto. In some embodiments, the dummy electrode 30, the driving electrode 100 and/or the sensing electrode 200 may include transparent conductive layers, and the transparent conductive layer may include indium tin oxide (ITO), tin oxide (SnO), indium zinc oxide (IZO), indium gallium zinc oxide (IGZO), indium tin oxide zinc (ITZO), antimony tin oxide (ATO), oxidation antimony zinc (AZO), other suitable transparent conductive materials or combinations thereof, but it is not restricted thereto. In some embodiments, the dummy electrode 30, the driving electrode 100 and/or the sensing electrode 200 may include metal materials, such as copper, aluminum, molybdenum, tungsten, gold, chromium, nickel, platinum, titanium, copper alloy, aluminum alloy, molybdenum alloy, tungsten alloy, gold alloy, chromium alloy, nickel alloy, platinum alloy, titanium alloy, other suitable metals, combinations thereof or other conductive material with greater conductivity or lower impedance, but it is not restricted thereto. In some embodiments, the driving electrode 100 and/or the sensing electrode 200 may include transparent conductive materials, metal materials or combinations thereof.

In some embodiments, as shown in FIG. 2, the touch display device 1 may further include a polarizing film 80. The polarizing film 80 may be disposed on the electrostatic discharge layer 50, and the electrostatic discharge layer 50 may be disposed between the polarizing film 80 and the touch electrode 20. In some embodiments, as shown in FIG. 2, the touch display device 1 may further include a dielectric layer 90. The dielectric layer 90 may be disposed on the first substrate 10, and the material of the dielectric layer 90 may include silicon oxide, silicon nitride, silicon oxy-nitride, other suitable dielectric materials, other suitable materials or combinations thereof, but it is not restricted thereto.

In some embodiments, as shown in FIG. 2, a thickness of the dielectric layer 90 may be in a range from 2,000 angstroms to 7,000 angstroms, the thickness of the touch electrode 20 or the thickness of the dummy electrode 30 may be in a range from 400 angstroms to 2,400 angstroms (400 angstroms≤thickness≤2400 angstroms), the thickness of the first dielectric layer 40 may be in a range from 2,000 angstroms to 7,000 angstroms (2000 angstroms≤thickness≤7000 angstroms), and the thickness of the electrostatic discharge layer 50 may be in a range from 5 microns to 30 microns (5 microns≤thickness≤30 microns), but it is not restricted thereto. In some embodiments, the thickness of the dielectric layer 90 may be about 4,000 angstroms, the thickness of the touch electrode 20 or the thickness of the dummy electrode 30 may be about 1,400 angstroms, the thickness of the first dielectric layer 40 may be about 4,000 angstroms, or the thickness of the electrostatic discharge layer 50 may be about 20 microns. The thickness of the above laminated layers may be adjusted according to requirements or material properties, and the disclosure is not restricted thereto.

In some embodiments, as shown in FIG. 2, the touch display device 1 may include a conductive wire 91 and/or a conductive wire 93. The conductive wire 91 and/or the conductive wire 93 may be disposed on the first substrate 10, and the conductive wire 91 and/or the conductive wire 93 may be electrically connected to the sensing electrode 200. The conductive wire 91 and/or the conductive wire 93 may be disposed for connecting the adjacent sensing electrodes 200, and thus may be regarded as bridge wires between the sensing electrodes 200. In some embodiments, the touch display device 1 may include other conductive wires (not shown), which may be electrically connected to the driving electrode 100; and the conductive wires may be disposed for connecting the adjacent driving electrodes 100, which may be regarded as bridge wires between the driving electrodes 100. The conductive wire 91 and the conductive wire 93 may be metal wires or transparent wires. In some embodiments, the conductive wire 93 is a metal wire, it may include copper, aluminum, molybdenum, tungsten, gold, chromium, nickel, platinum, titanium, copper alloy, aluminum alloy, molybdenum alloy, tungsten alloy, chromium alloy, nickel alloy, titanium alloy, other suitable metals, combinations thereof or any other conductive material with greater conductivity or lower impedance, but it is not restricted thereto. In some embodiments, the conductive wire 93 is a transparent wire, it may include indium tin oxide (ITO), tin oxide (SnO), indium zinc oxide (IZO), indium gallium zinc oxide (IGZO), indium tin oxide zinc (ITZO), antimony tin oxide (ATO), oxidation antimony zinc (AZO), other suitable transparent conductive materials or combinations thereof, but it is not restricted thereto.

In some embodiments, as shown in FIG. 2, the dielectric layer 90 of the touch display device 1 may have at least two through holes 90A disposed corresponding to the conductive wire 91 and/or at least a through hole 90B disposed corresponding to the conductive wire 93. By disposing or filling the sensing electrode 200 into the through holes 90A, the two adjacent sensing electrodes 200 may be electrically connected through the conductive wire 91. In addition, by disposing or filling the sensing electrode 200 into the through hole 90B, a signal received from the sensing electrode 200 may be transferred through the conductive wire 93.

In some embodiments, as shown in FIG. 2, the touch display device 1 may include a second substrate 60 and/or a display layer 70. The second substrate 60 may be disposed corresponding to the first substrate 10, and the display layer 70 may be disposed between the first substrate 10 and the second substrate 60. As shown in FIG. 2, the first substrate 10 has a first surface 110 and a second surface 120 opposite to the first surface 110. For example, the first surface 110 is away from the second substrate 60, and touch electrode 20 may be disposed on the first surface 110 of the first substrate 10. The touch display device 1 may be an integrated touch display panel with touch electrodes disposed on the display panel (touch on display, TOD). The electrostatic discharge layer 50 may be disposed between the polarizing film 80 and the touch electrode 20. The material of the second substrate 60 may include a glass substrate, a sapphire substrate, a plastic substrate or the suitable materials, but it is not restricted thereto. The material of the second substrate 60 may be silicon carbide (SiC), gallium nitride (GaN), silicon dioxide (SiO2) or combinations thereof. The material of the plastic substrate may include polyimide (PI), polyethylene terephthalate (PET), or polycarbonate (PC), but it is not restricted thereto. In some embodiments, the first substrate 10 and/or the second substrate 60 may be made of the same material. In some embodiments, the first substrate 10 and/or the second substrate 60 may be made of different materials. The touch display device may include a liquid crystal (LC), an organic light-emitting diode (OLED), a quantum dot (QD), a fluorescence material, a phosphor material, a light-emitting diode (LED), a micro light-emitting diode, a mini light-emitting diode or any other display medium, but it is not restricted thereto. In some embodiments, the material of the electrostatic discharge layer 50 may include an organic material, an inorganic material or combinations thereof. In some embodiments, the material of the electrostatic discharge layer 50 may include an organic dielectric material doped with a conductive material, an inorganic dielectric material doped with a conductive material (a transparent conductive metal oxide) or combinations thereof. In some embodiments, the material of the electrostatic discharge layer 50 may include the doping material selected from the group consisting of phosphorus-containing silicon oxide (SiOx:P), phosphorus-doped silicon nitride (SiNx:P), phosphorus-doped silicon oxy-nitride (SiOxNy:P), boron-doped silicon oxide (SiOx:B), boron-doped silicon nitride (SiNx:B), boron-doped silicon oxy-nitride (SiOxNy:B), antimony tin oxide (ATO), oxidation indium (InO), tin oxide (AnO), indium tin oxide (ITO), tin oxide (SnO), indium zinc oxide (IZO), indium gallium zinc oxide (IGZO), indium tin oxide zinc (ITZO), oxidation antimony zinc (AZO), poly(3,4-ethylenedioxythiophene) polystyrene sulfonate (PEDOT:PSS), carbon nanotube, nano silver wire and pressure sensitive rubber material doped with carbon nanotubes, but it is not restricted thereto.

In some embodiments, the material of the first dielectric layer 40 may include silicon oxide, silicon nitride, silicon oxy-nitride, other suitable dielectric materials, or combinations thereof, but it is not limited thereto. The sheet resistance of the first dielectric layer 40 may be greater than or equal to 1.0×1015 Ohms/unit area. The first dielectric layer 40 may have high electrical insulation properties. In some embodiments, the first dielectric layer 40 may have high water-oxygen blocking properties.

In one embodiment, as shown in FIG. 2, the electrostatic discharge layer 50 may include a pressure sensitive adhesive layer having micro-conductive properties, and the pressure sensitive adhesive layer may be used for bonding the polarizing film 80 to the touch display device. In some embodiments, the material of the electrostatic discharge layer 50 may include a pressure sensitive rubber material doped with an conductive material, such as the material including the pressure sensitive rubber material doped with PEDOT:PSS, the pressure sensitive rubber material doped with nano silver wires, the pressure sensitive rubber material doped with carbon nanotubes, or the pressure sensitive rubber material doped with other conductive materials, but it is not restricted thereto.

In some embodiments, the touch display device 1 may further include a ground electrode 300 disposed on the first substrate 10.

Figure 3:
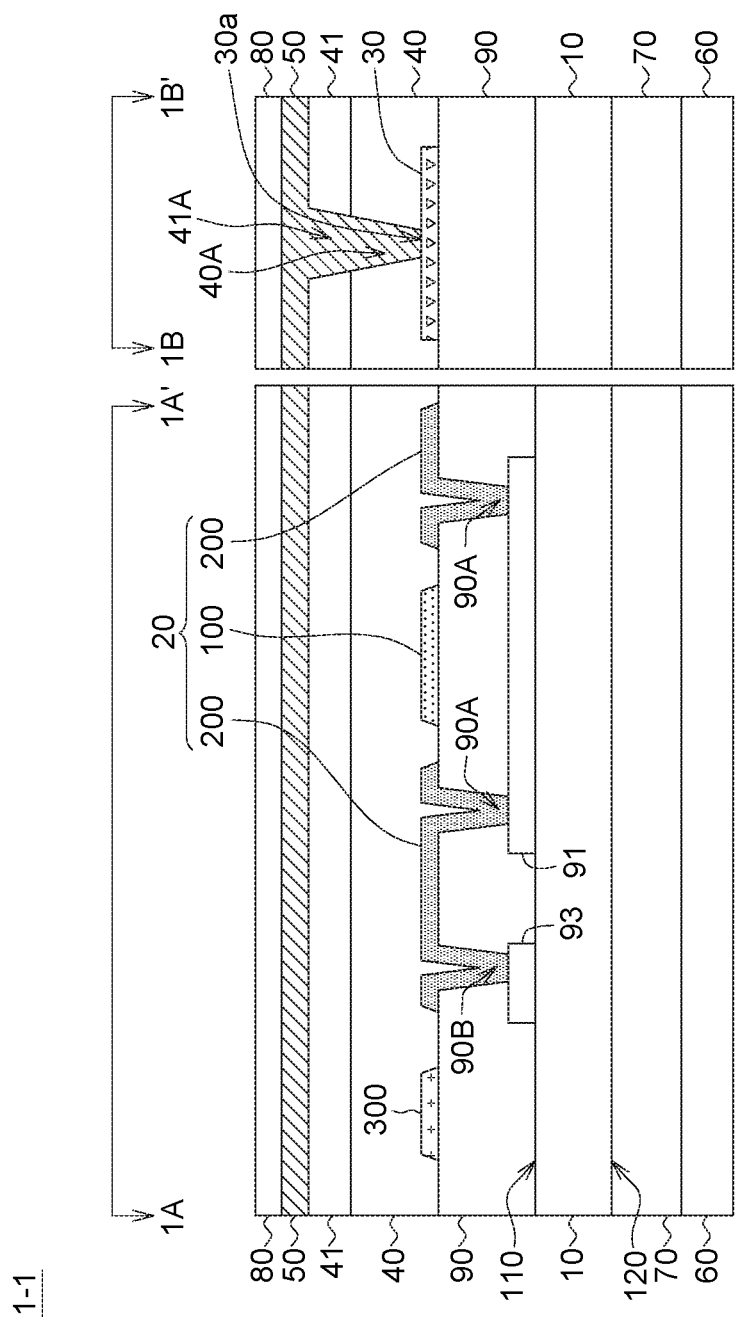
FIG. 3 is a cross-sectional view showing a touch display device according to another embodiment of this disclosure.

FIG. 3 is a cross-sectional view showing a touch display device according to another embodiment of this disclosure. The top view of the touch display device of FIG. 3 may refer to FIG. 1. FIG. 3 is a cross-sectional structure taken along the cross-sectional line 1A-1A' and the cross-sectional line 1B-1B' of FIG. 1. The same or similar components as those of the foregoing embodiments are denoted by the same or similar symbols, and related descriptions of the same or similar components are referred to the foregoing embodiments, and will not be described herein again.

In some embodiments, as shown in FIG. 3, a touch display device 1-1 may further include a second dielectric layer 41. For example, the second dielectric layer 41 may be disposed on the first dielectric layer 40, and the second dielectric layer 41 may be disposed between the first dielectric layer 40 and the electrostatic discharge layer 50. In some embodiments, the second dielectric layer 41 may include an organic dielectric layer, but it is not restricted thereto. The thickness of the second dielectric layer 41 may in a range from about 1 micron to 5 microns (1 micron≤thickness≤5 microns), but it is not restricted thereto.

As shown in FIG. 3, the second dielectric layer 41 may have at least a second through hole 41A, which may correspond to the first through hole 40A. In some embodiments, the electrostatic discharge layer 50 may contact with the dummy electrode 30 through the first through hole 40A and/or the second through hole 41A. Specifically, a portion of the electrostatic discharge layer 50 may be filled into (or disposed into) the correspondingly first through hole 40A and second through hole 41A for contacting the dummy electrode 30.

In some embodiments, as shown in FIG. 3, the thickness of the dielectric layer 90 may be in a range from 2,000 angstroms to 7,000 angstroms (2,000 angstroms≤thickness≤7,000 angstroms), the thickness of the touch electrode 20 and the thickness of the dummy electrode 30 may be in a range from 400 angstroms to 2,400 angstroms (400 angstroms≤thickness≤2,400 angstroms), the thickness of the first dielectric layer 40 may be in a range from 800 angstroms to 6000 angstroms (800 angstroms≤thickness 6,000 angstroms), the thickness of the second dielectric layer 41 may be ranged from 1 microns to 5 microns (1 microns≤thickness≤5 microns), and the thickness of the electrostatic discharge layer 50 may be in a range from 5 microns to 30 microns (5 microns≤thickness≤30 microns). In some embodiments, the thickness of the dielectric layer 90 may be about 4,000 angstroms, the thickness of the touch electrode 20 and the dummy electrode 30 may be about 1,400 angstroms, the thickness of the first dielectric layer 40 may be about 4,000 angstroms, the thickness of the second dielectric layer 41 may be about 1 micron, and/or the thickness of the electrostatic discharge layer 50 may be about 20 microns, but it is not restricted thereto.

In some embodiments, as shown in FIG. 3, the electrostatic discharge layer 50 may include a pressure sensitive adhesive layer having semi-conductive properties, and the pressure sensitive adhesive layer may be used for bonding the polarizing film 80, but this disclosure is not restricted thereto. However, the electrostatic discharge layer 50 functions as a material of the pressure sensitive adhesive layer having the semi-conductive properties as previously mentioned, and detailed descriptions thereof will be omitted here.

Figure 4:
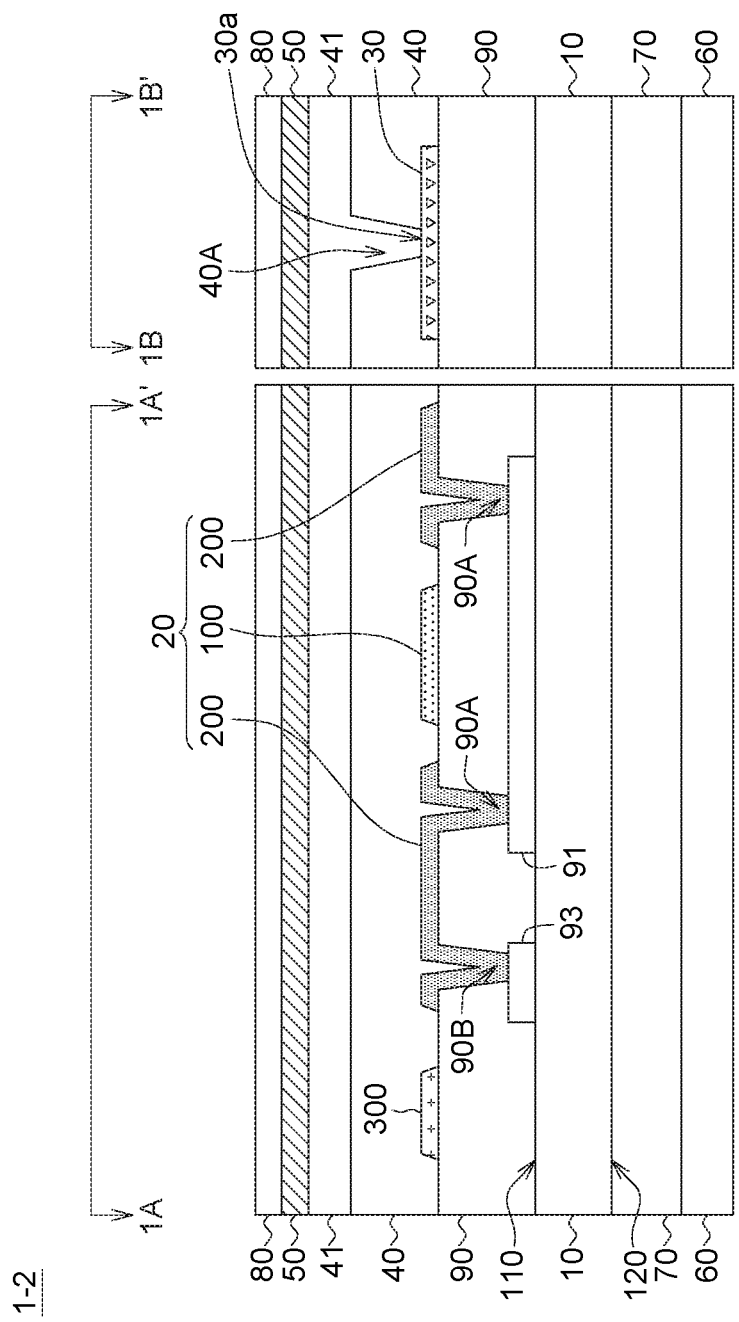
FIG. 4 is a cross-sectional view showing a touch display device according to another embodiment of this disclosure.

FIG. 4 is a cross-sectional view showing a touch display device according to an embodiment of this disclosure. The top view of the touch display device of FIG. 4 may be referred to FIG. 1. FIG. 4 is a cross-sectional structure taken along the cross-sectional line 1A-1A' and the cross-sectional line 1B-1B' of FIG. 1. The same or similar components as those of the foregoing embodiments are denoted by the same or similar symbols, and related descriptions of the same or similar components are referred to the foregoing embodiments, and will not be described herein again.

As shown in FIG. 4, the second dielectric layer 41 may contact with the dummy electrode 30 through the first through hole 40A. The second dielectric layer 41 may be filled into (or disposed into) the first through hole 40A for contacting the dummy electrode 30. In some embodiments, the material of the second dielectric layer 41 may include an organic dielectric material or other suitable materials, but it is not restricted thereto. In some embodiments, the charge transfer efficiency of the second dielectric layer 41 may be greater than the charge transfer efficiency of the first dielectric layer 40. In some embodiments, the water-oxygen blocking effect of the first dielectric layer 40 may be greater than the second dielectric layer 41. In some embodiments, the touch display device includes the first dielectric layer 40 and the second dielectric layer 41, so the touch display device may include the better water-oxygen blocking effect as compared with a touch display device having only a single layer of the first dielectric layer 40. The first dielectric layer 40 has a first sheet resistance, and the second dielectric layer 41 has a second sheet resistance less than the first sheet resistance. In some embodiments, the impedance property (e.g., the sheet resistance) of first dielectric layer 40 may be about 1,000 times to the impedance property (e.g., the sheet resistance) of the second dielectric layer 41, but it is not restricted thereto. For example, the first dielectric layer 40 and the second dielectric layer 41 may have the same film thickness (e.g., 4,000 angstroms), and the 100V voltage may be applied to an electrode having an area of about 1 mm2 to measure the impedances of the first dielectric layer 40 and/or the impedances of the second dielectric layer 41, the impedance of the first dielectric layer 40 may be about $2.1 \times 10^{13}$ Ohms ($\Omega$), and/or the impedance of the second dielectric layer 41 may be about $2.4 \times 10^{10}$ Ohms ($\Omega$), but it is not restricted thereto. The discharging may be implemented by, f introducing the charges into the electrostatic discharge layer 50 through the second dielectric layer 41 with the lower impedance. In some embodiments, the second dielectric layer 41 may contact with the electrostatic discharge layer 50, the charges accumulated at the dummy electrode 30 may be transferred into the second dielectric layer 41 through the dummy electrode 30, and the second dielectric layer 41 may discharge the charges by transferring the charges into the electrostatic discharge layer 50. In some embodiments, the time for discharging the charges at the dummy electrode 30 may be less than 1 second.

According to the embodiment of this disclosure, the organic dielectric material of the above-mentioned second dielectric layer 41 may have the better charge transfer efficiency, but the water-oxygen blocking effect may be lower than the first dielectric layer 40. Therefore, if only the second dielectric layer 41 is disposed on the touch electrode 20 and the dummy electrode 30, the moisture may not be effectively reduced. Because the charge accumulation or moisture impact may cause the corrosion phenomenon on the electrodes or wires, or even cause the damage to the electrode structure. Therefore, according to the embodiment, the second dielectric layer 41 may be disposed between the first dielectric layer 40 and the electrostatic discharge layer 50, so that the first dielectric layer 40 is disposed between the second dielectric layer 41 and the touch electrode 20 (and the dummy electrode 30) to reduce the corrosion problem of the electrodes or wires. The second dielectric layer 41 may contact with the dummy electrode 30 through the first through hole 40A. Because the first dielectric layer 40 with higher impedance may have the better water-oxygen blocking effect, the corrosion of the electrodes or wires can be reduced, the charges accumulated at the dummy electrode 30 may be transferred into the second dielectric layer 41 through the first through hole 40A, and the second dielectric layer 41 may transfer the charges to the electrostatic discharge layer 50 for outputting.

In some embodiments, as shown in FIG. 4, the electrostatic discharge layer 50 may include a pressure sensitive adhesive layer having semi-conductive properties, and the pressure sensitive adhesive layer may be used for bonding the polarizing film 80 or other suitable polarizing films, but it is not restricted thereto. However, the electrostatic discharge layer 50 may include a material of the pressure sensitive adhesive layer having the semi-conductive properties as previously mentioned, and detailed descriptions thereof will be omitted here.

Figure 5:
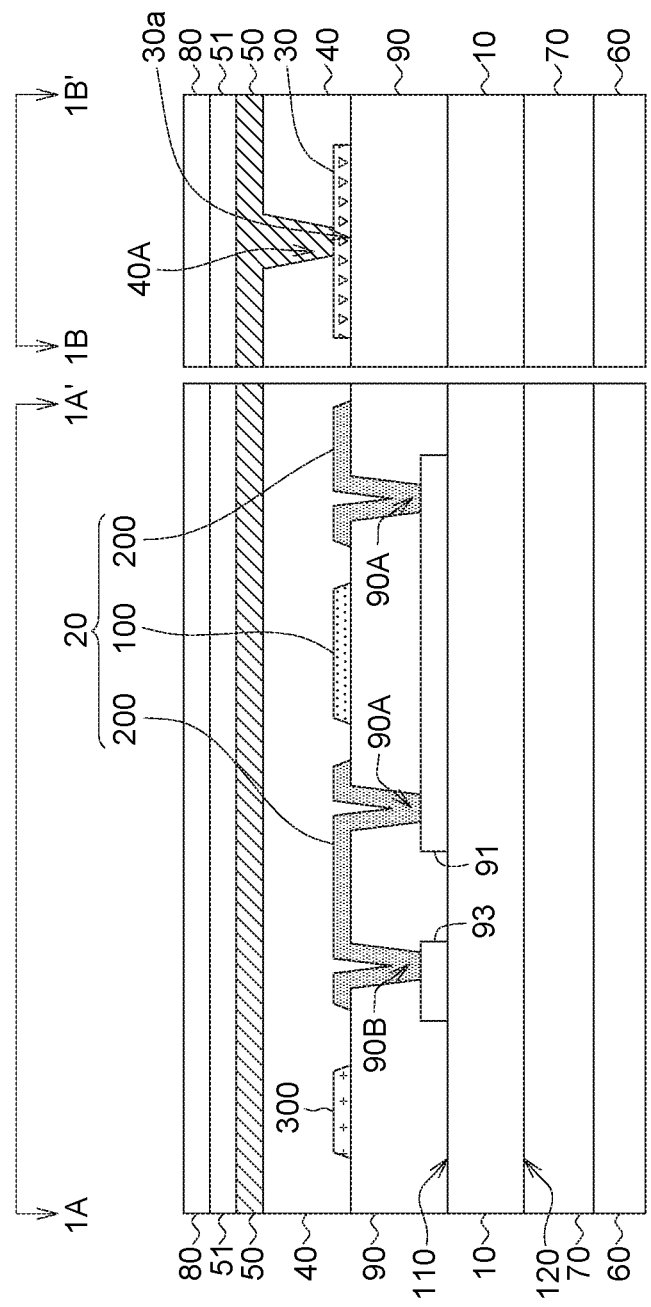
FIG. 5 is a cross-sectional view showing a touch display device according to another embodiment of this disclosure.

FIG. 5 is a cross-sectional view showing a touch display device according to another embodiment. The top view of the touch display device of FIG. 5 may be referred to FIG. 1. FIG. 5 is a cross-sectional structure taken along the cross-sectional line 1A-1A' and the cross-sectional line 1B-1B' of FIG. 1. The same or similar components as those of the foregoing embodiments are denoted by the same or similar symbols, and related descriptions of the same or similar components are referred to the foregoing embodiments, and will not be described herein again.

In some embodiments, as shown in FIG. 5, the touch display devices 1 to 3 as described above may further include a pressure sensitive adhesive layer 51 disposed on the electrostatic discharge layer 50. The polarizing film 80 may be disposed on the electrostatic discharge layer 50, and the pressure sensitive adhesive layer 51 may be disposed between the electrostatic discharge layer 50 and the polarizing film 80. For example, the pressure sensitive adhesive layer 51 may include the pressure sensitive adhesive (PSA), which may not have semi-conductive properties, the pressure sensitive adhesive layer 51 may be not doped with conductive material, but it is not restricted thereto. The composition of the pressure sensitive adhesive may include a rubber type, an acrylic type, a silica gel type or the like, but it is not restricted thereto.

As shown in FIG. 5, the first dielectric layer 40 has at least a first through hole 40A disposed corresponding to the dummy electrode 3, and the electrostatic discharge layer 50 may contact with the dummy electrode 30 through the first through hole 40A.

In some embodiments, the material of the electrostatic discharge layer 50 may include an organic dielectric material doped with an conductive material, an inorganic dielectric material doped with an conductive material or a mixture of both, wherein specific examples have been mentioned previously, and detailed descriptions thereof will be omitted here. In addition, the electrostatic discharge layer 50 may be formed by chemical vapor deposition (CVD), sputtering, resistor heating evaporation, electron beam evaporation, pulsed laser deposition or other suitable deposition methods. The chemical vapor deposition may be the low pressure chemical vapor deposition (LPCVD), low temperature chemical vapor deposition (LTCVD), rapid thermal chemical vapor deposition (RTCVD), plasma enhanced chemical vapor deposition (PECVD), atomic layer deposition (ALD) of atomic layer chemical vapor deposition or other suitable methods, but it is not restricted thereto.

Figure 6:
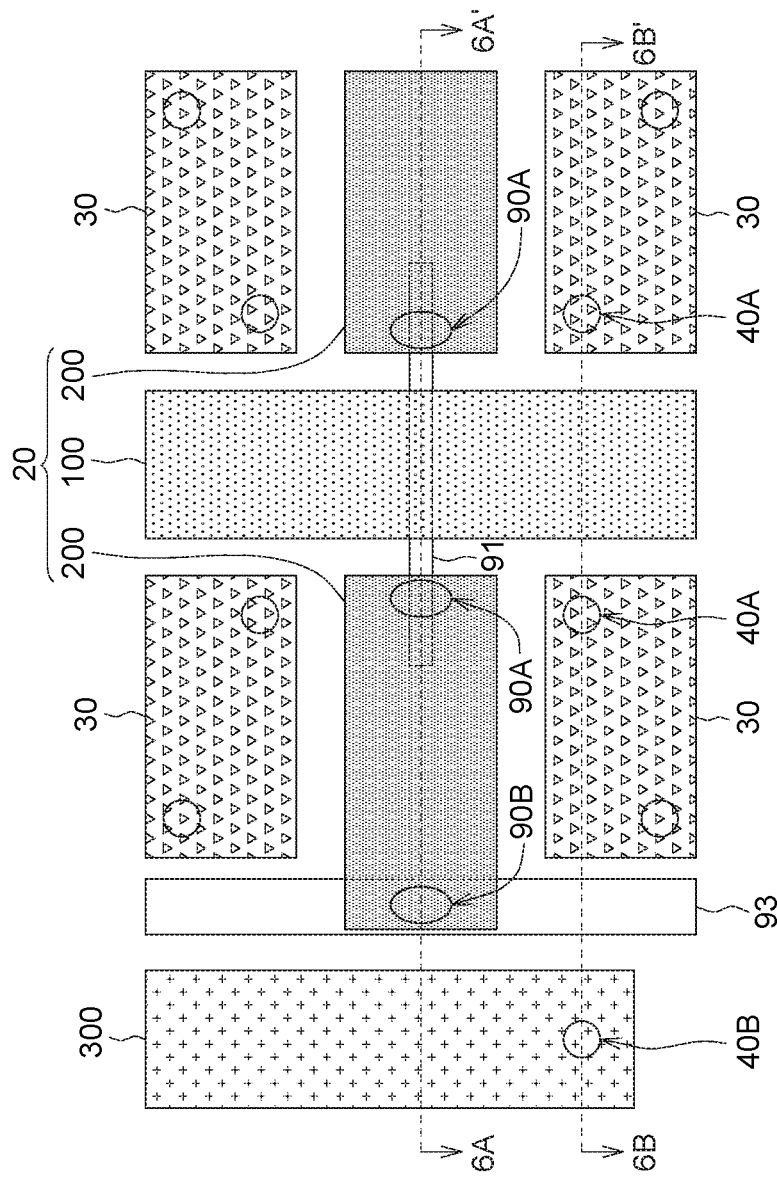
FIG. 6 is a top view showing a touch display device according to another embodiment of this disclosure.
Figure 6A:
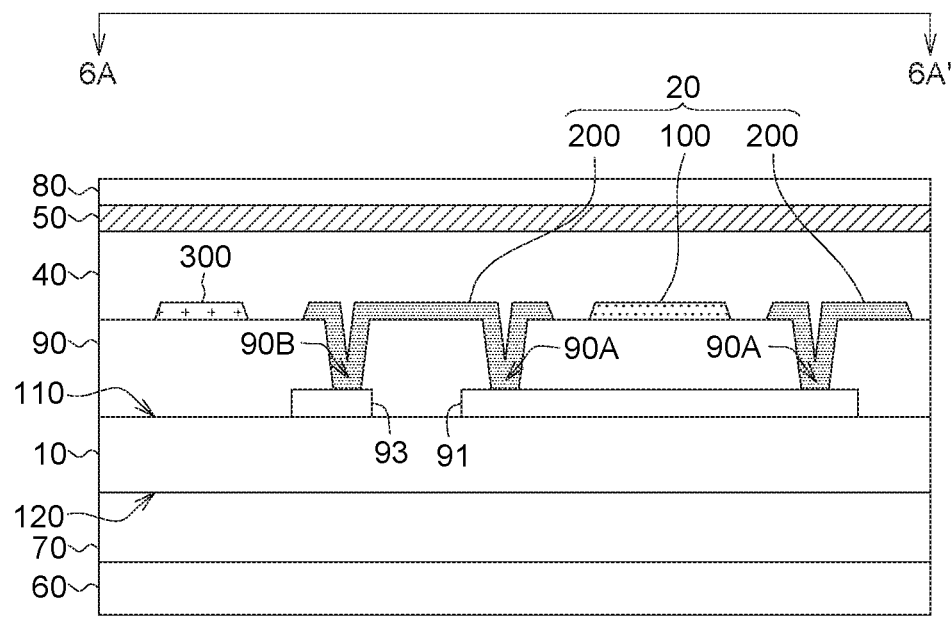
FIG. 6A is a cross-sectional view taken along a cross-sectional line 6A-6A' of FIG. 6.
Figure 6B:
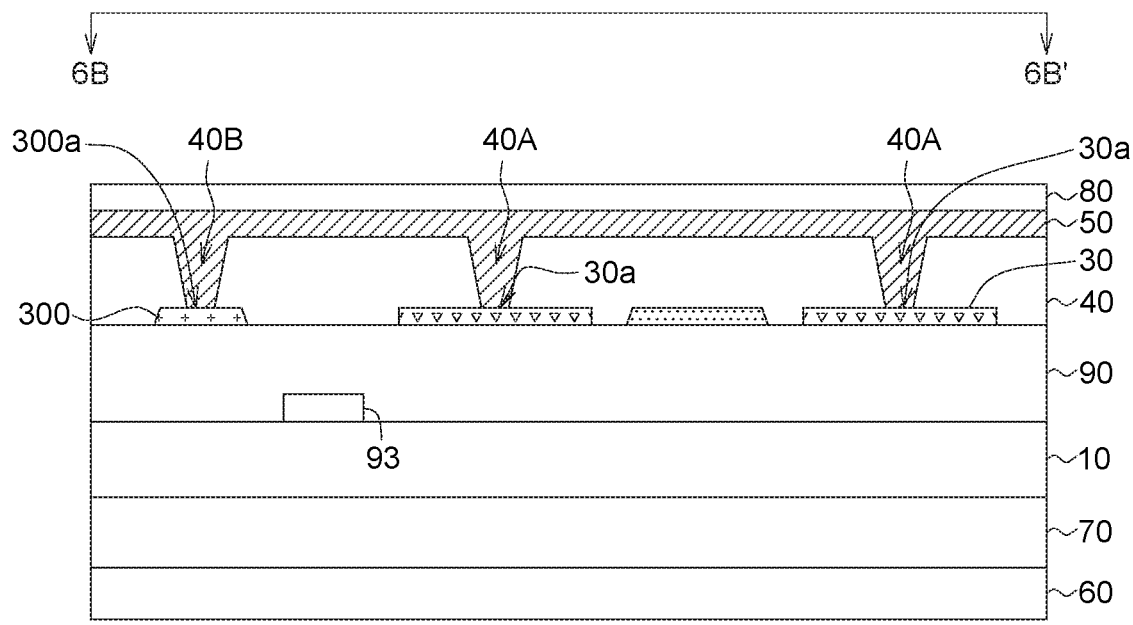
FIG. 6B is a cross-sectional view taken along a cross-sectional line 6B-6B' of FIG. 6.

FIG. 6 is a top view showing a touch display device according to another embodiment of this disclosure, FIG. 6A is a cross-sectional view taken along a cross-sectional line 6A-6A' of FIG. 6, and FIG. 6B is a cross-sectional view taken along a cross-sectional line 6B-6B' of FIG. 6. The same or similar components as those of the foregoing embodiments are denoted by the same or similar symbols, and related descriptions of the same or similar components are referred to the foregoing embodiments, and will not be described herein again.

In some embodiment, as shown in FIGS. 6, 6A and 6B, in a touch display device 2, the first dielectric layer 40 may have at least a third through hole 40B disposed corresponding to the ground electrode 30, and the electrostatic discharge layer 50 may contact with the ground electrode 300 through the third through hole 40B. Specifically, a portion of the electrostatic discharge layer 50 may be filled into (or disposed into) the third through hole 40B for contacting the ground electrode 300, but it is not restricted thereto.

According to the embodiment of this disclosure, because the sheet resistance of the electrostatic discharge layer 50 may be in a range from $1.0 \times 10^8$ Ohms/unit area to $1.0 \times 10^{11}$ Ohms/unit area ($1.0 \times 10^8$ Ohms/unit area≤sheet resistance≤$1.0 \times 10^{11}$ Ohms/unit area), the discharging charge effect is increased, or the touch sensing function or display quality is increased. Moreover, the conductive properties (or the sheet resistance) of the electrostatic discharge layer 50 may be insufficient to achieve the conduction of the electrical signal, or the improper conduction phenomenon between the touch electrode 20 or other conductive elements is not caused.

Figure 7:
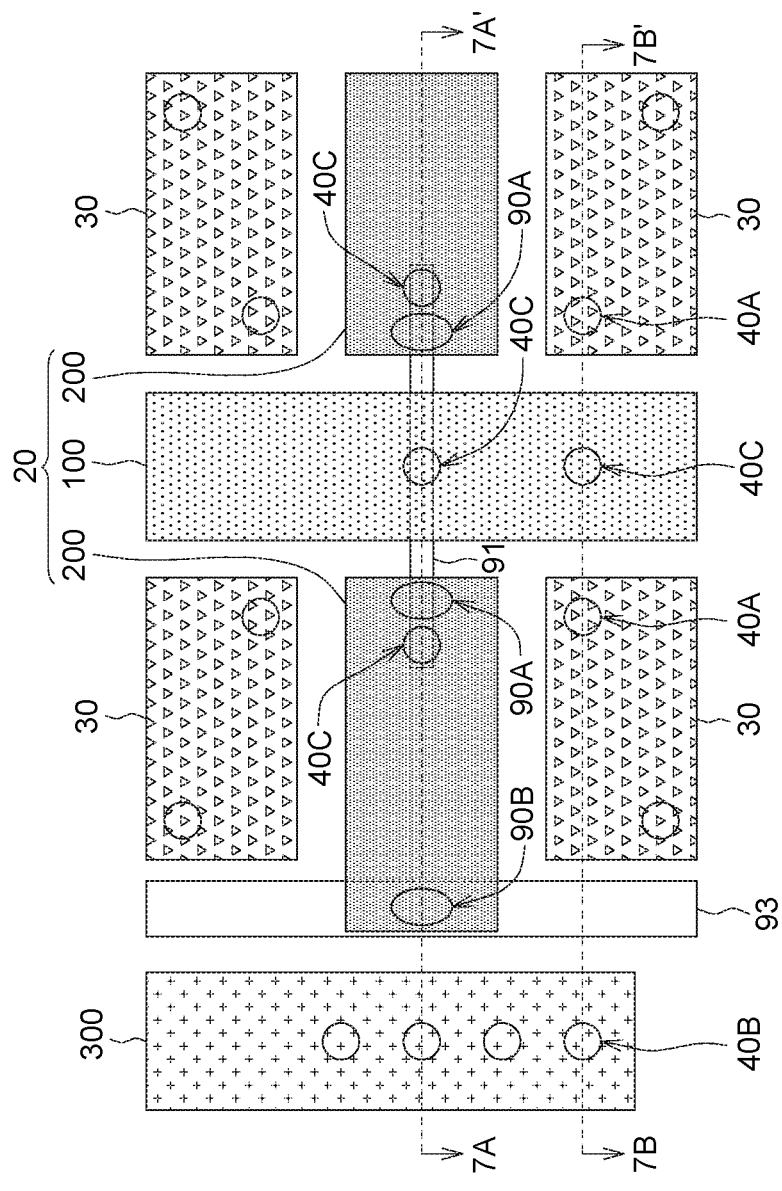
FIG. 7 is a top view showing a touch display device according to another embodiment of this disclosure.
Figure 7A:
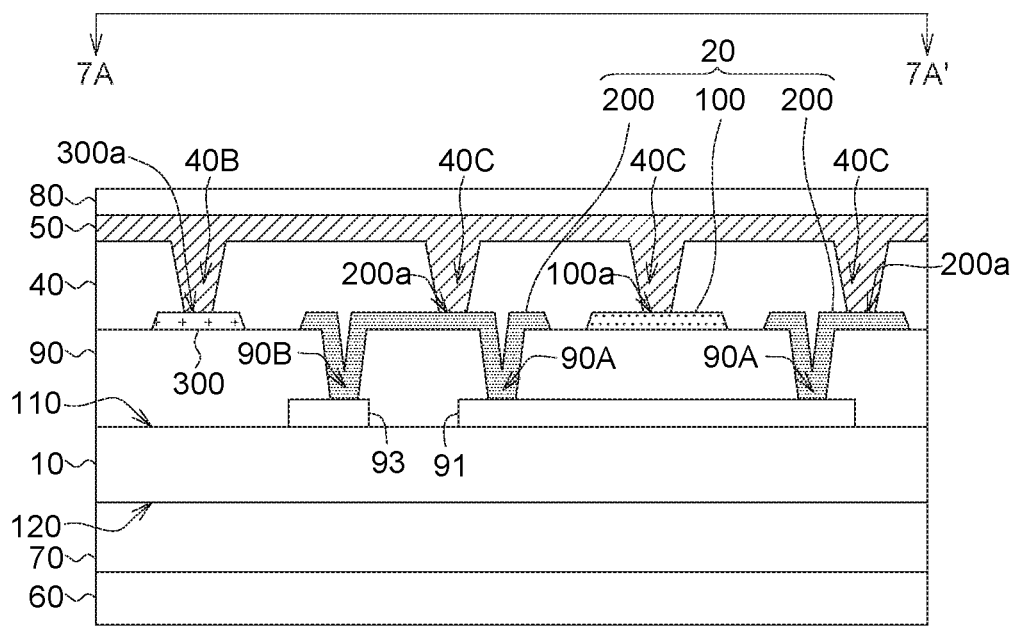
FIG. 7A is a cross-sectional view taken along a cross-sectional line 7A-7A' of FIG. 7.
Figure 7B:
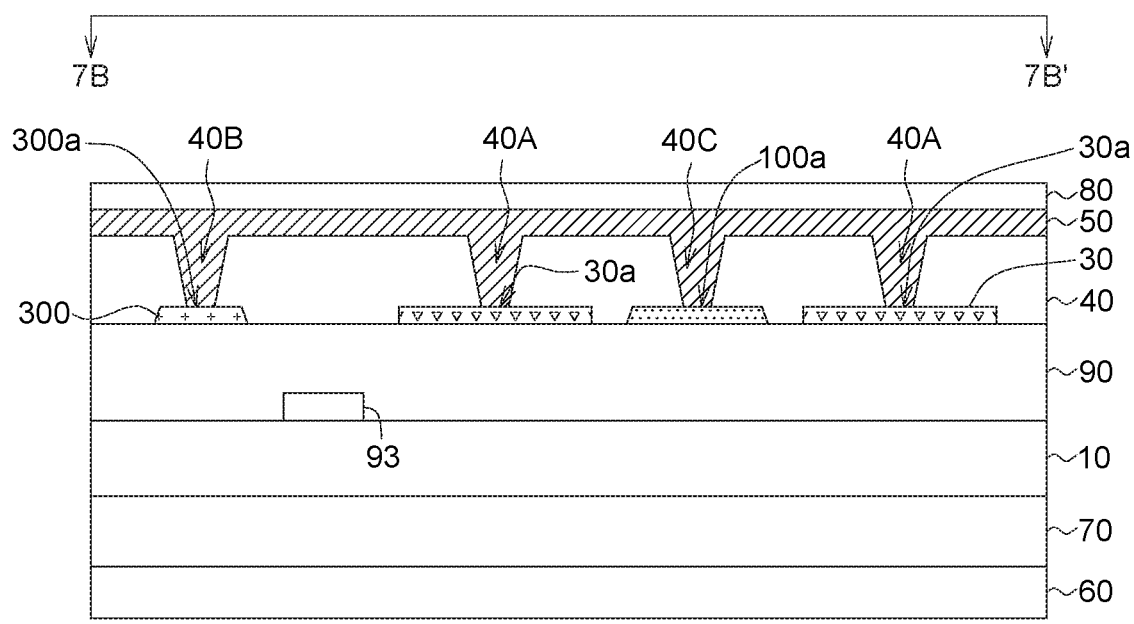
FIG. 7B is a cross-sectional view taken along a cross-sectional line 7B-7B' of FIG. 7.

FIG. 7 is a top view showing a touch display device according to another embodiment of this disclosure. FIG. 7A is a cross-sectional view taken along a cross-sectional line 7A-7A' of FIG. 7, and FIG. 7B is a cross-sectional view taken along a cross-sectional line 7B-7B' of FIG. 7. The same or similar components as those of the foregoing embodiments are denoted by the same or similar symbols, and related descriptions of the same or similar components are referred to the foregoing embodiments, and will not be described herein again.

As shown in FIGS. 7, 7A and 7B, in a touch display device 3 of this embodiment, the first dielectric layer 40 may have at least a fourth through hole 40C (or fourth through hole 40D) disposed corresponding on the touch electrode 20, and the fourth through hole 40C (the fourth through hole 40D) may correspond to the driving electrode 100 or the sensing electrode 200. The electrostatic discharge layer 50 may contact with the touch electrode 20 (including the driving electrode 100 or the sensing electrode 200) through the fourth through hole 40C (the fourth through hole 40D).

For example, as shown in FIGS. 7A and 7B, the fourth through hole 40C may correspond to the driving electrode 100 of the touch electrode 20 and/or expose the driving electrode 100, and the electrostatic discharge layer 50 may contact with the driving electrode 100 through the fourth through hole 40C. For example, the fourth through hole 40D may correspond to the sensing electrode 200 of the touch electrode 20 and/or expose the sensing electrode 200, and the electrostatic discharge layer 50 may contact with the sensing electrode 200 through the fourth through hole 40D.

According to the embodiment of this disclosure, because the sheet resistance of the electrostatic discharge layer 50 may be in a range from $1.0 \times 10^8$ Ohms/unit area to $1.0 \times 10^{11}$ Ohms/unit area, the charge discharging effect is obtained, but the conductivity is insufficient to achieve the conduction of the electrical signal, so that accumulated charges may be discharged by contacting the electrostatic discharge layer 50 with the dummy electrode 30, or by contacting the electrostatic discharge layer 50 with the touch electrode 20. The electrostatic discharge layer 50 does not affect the conductive condition, for example, some conductive components or electrodes (e.g., the driving electrode 100, the sensing electrode 200 and the dummy electrode 30) are electrically isolated with each other, or the short-circuit between the conductive components or electrodes may be reduced. The discharging effect in the touch display device 3 may be increased, or the touch sensing function or display quality may be increased through designed examples of the embodiments.

Figure 8:
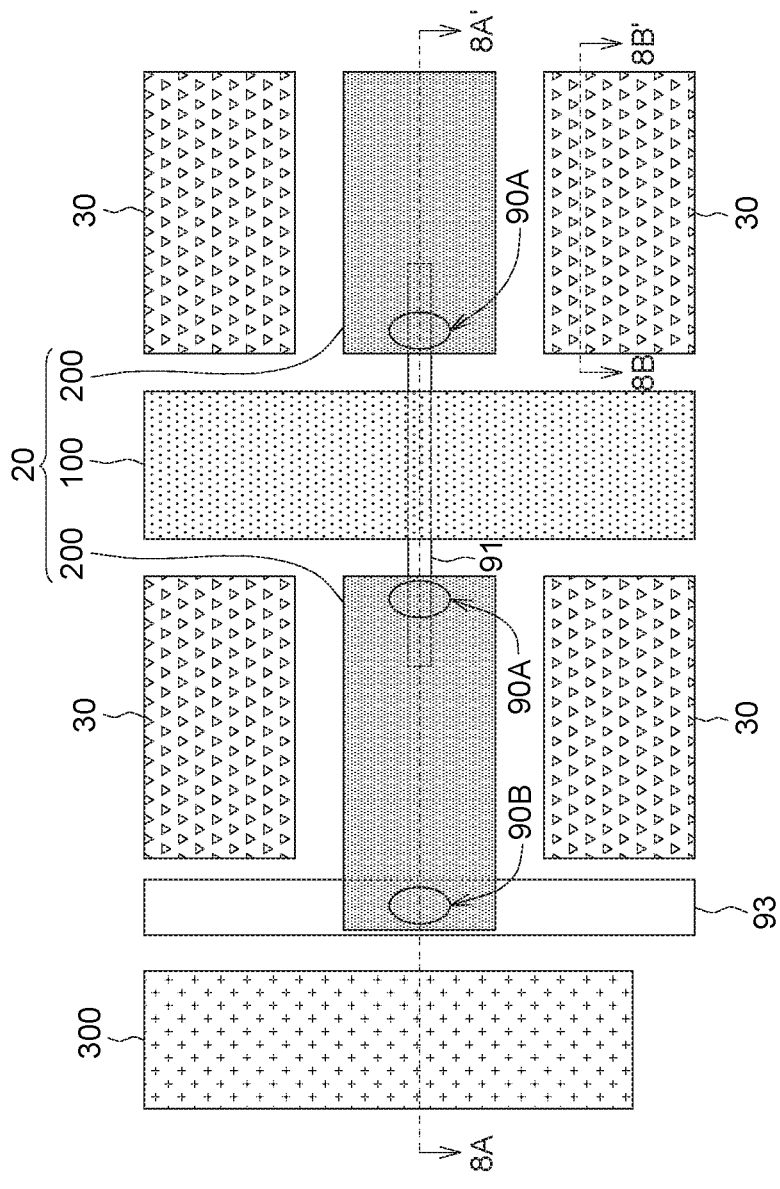
FIG. 8 is a top view showing a touch display device according to another embodiment of this disclosure.
Figure 9:
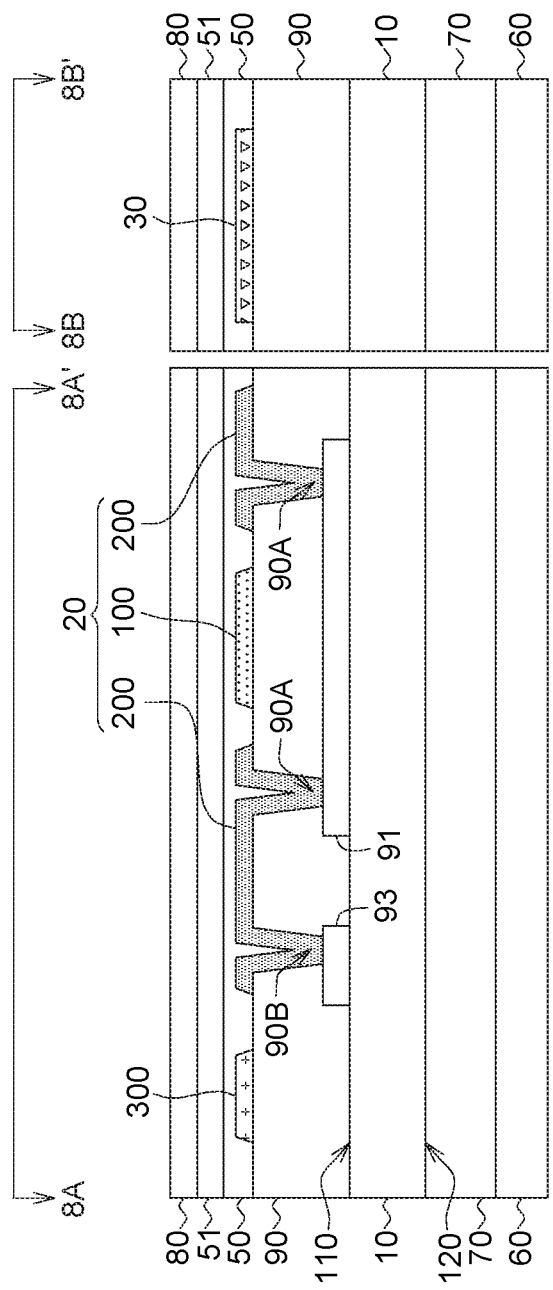
FIG. 9 is a cross-sectional view taken along a cross-sectional line 8A-8A' and a cross-sectional line 8B-8B' of FIG. 8.

FIG. 8 is a top view showing a touch display device according to another embodiment of this disclosure. FIG. 9 is a cross-sectional view taken along a cross-sectional line 8A-8A' and a cross-sectional line 8B-8B' of FIG. 8. The same or similar components as those of the foregoing embodiments are denoted by the same or similar symbols, and related descriptions of the same or similar components are referred to the foregoing embodiments, and will not be described herein again.

As shown in FIGS. 8 and 9, a touch display device 4 may include a first substrate 10; a touch electrode 20 including a driving electrode 100, a sensing electrode 200; a dummy electrode 30 and an electrostatic discharge layer 50. For example, the touch electrode 20 (the driving electrode 100 and the sensing electrode 200) may be disposed on the first substrate 10, and the dummy electrode 30 is disposed and adjacent to at least one of the driving electrodes 100 and/or at least one of the sensing electrodes 200, but it is not restricted thereto. Two of the dummy electrode 30, the driving electrode 100 and the sensing electrode 200 are separated from each other, or the dummy electrode 30, the driving electrode 100 and the sensing electrode 200 may be not overlapped with each other in the normal direction of the first substrate 10. The dummy electrode 30 and the touch electrode 20 (the driving electrode 100 and the sensing electrode 200) may be electrically insulated from each other. The electrostatic discharge layer 50 may be disposed on the driving electrode 100, the sensing electrode 200 and the dummy electrode 30. The electrostatic discharge layer 50 is disposed on the dummy electrode 30 and contacts with the dummy electrode 30. The sheet resistance of the electrostatic discharge layer 50 may be in a range from $1.0 \times 10^8$ Ohms/unit area to $1.0 \times 10^{11}$ Ohms/unit area, but it is not restricted thereto.

According to the embodiment of this disclosure, part of the electrostatic discharge layer 50 may contact with the dummy electrode 30, and the sheet resistance of the electrostatic discharge layer 50 may be in a range from $1.0 \times 10^8$ Ohms/unit area to $1.0 \times 10^{11}$ Ohms/unit area ($1.0 \times 10^8$ Ohms/unit area≤sheet resistance≤$1.0 \times 10^{11}$ Ohms/unit area), so the accumulated charges may be discharged, or the function of the touch electrode or display quality of the touch display device can be increased.

In some embodiments, the material of the electrostatic discharge layer 50 may include phosphorus-doped silicon oxide, phosphorus-doped silicon nitride, phosphorus-doped silicon oxy-nitride, boron-doped silicon oxide, boron-doped silicon nitride and boron-doped silicon oxy-nitride or other suitable materials, but it is not restricted thereto. Specifically, according to the embodiment of this disclosure, the material property of the electrostatic discharge layer 50 may include the greater water-oxygen blocking effect, and the sheet resistance of the electrostatic discharge layer 50 may be in a range from $1.0 \times 10^8$ Ohms/unit area to $1.0 \times 10^{11}$ Ohms/unit area, so that the charge discharge effect may be increased.

In some embodiments, as shown in FIG. 9, the touch display device 4 may further include a second substrate 60, a display layer 70 and a polarizing film 80. The second substrate 60 is disposed corresponding to the first substrate 10, and the display layer 70 is disposed between the first substrate 10 and the second substrate 60. The first substrate 10 has a first surface 110 and a second surface 120 opposite to each other. The first surface 110 is away from the second substrate 60, the touch electrode 20 is disposed on the first surface 110, and the display layer 70 is disposed adjacent to the second surface 120, so the touch display device 4 has the integrated touch display panel with touch electrodes disposed on the display panel (touch on display, TOD), but it is not restricted thereto. The polarizing film 80 is disposed on a surface of the first substrate 10 away from the second substrate 60, and the electrostatic discharge layer 50 is located between the polarizing film 80 and the first substrate 10.

In some embodiments, as shown in FIG. 9, the touch display device 4 may further include a pressure sensitive adhesive layer 51 disposed on the first electrostatic discharge layer 50. In some embodiments, the pressure sensitive adhesive layer 51 may or may not have semi-conductive properties, but it is not restricted thereto.

For example, as shown in FIG. 9, the touch display device 4 may further include a second dielectric layer (not shown), the second dielectric layer may be disposed on the electrostatic discharge layer 50 and disposed between the first electrostatic discharge layer 50 and the pressure sensitive adhesive layer 51. The second dielectric layer may include an organic dielectric material, or other suitable materials.

The disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display device, comprising:
   a first substrate;
   a touch electrode, disposed on the first substrate, and the touch electrode comprising a driving electrode and a sensing electrode, wherein the driving electrode is disposed adjacent to the sensing electrode;
   a dummy electrode, disposed on the first substrate and adjacent to at least one of the driving electrode and the sensing electrode, wherein two of the dummy electrode, the driving electrode and the sensing electrode are separated from each other;
   a first dielectric layer, disposed on the touch electrode and the dummy electrode, the first dielectric layer having at least one first through hole disposed corresponding to the dummy electrode;
   an electrostatic discharge layer, disposed on the first dielectric layer, the electrostatic discharge layer contacting with the dummy electrode through the first through hole, and
   a second dielectric layer, disposed between the first dielectric layer and the electrostatic discharge layer, and the second dielectric layer contacted with the dummy electrode through the first through hole,
   wherein the first dielectric layer has a first sheet resistance, and the second dielectric layer has a second sheet resistance less than the first sheet resistance.

2. The touch display device according to claim 1, wherein a sheet resistance of the electrostatic discharge layer is in a range from $1.0 \times 10^8$ Ohms/unit area to $1.0 \times 10^{11}$ Ohms/unit area.

3. The touch display device according to claim 1, an impedance of the first dielectric layer is $2.1 \times 10^{13}$ Ohms ($\Omega$).

4. The touch display device according to claim 1, an impedance of the second dielectric layer is $2.4 \times 10^{10}$ Ohms ($\Omega$).

5. The touch display device according to claim 1, a thickness of the second dielectric layer is in a range from 1 micron to 5 microns.

6. The touch display device according to claim 1, further comprising a ground electrode disposed on the first substrate, wherein the first dielectric layer further has at least a third through hole disposed corresponding to the ground electrode, and the electrostatic discharge layer contacts with the ground electrode through the third through hole.

7. The touch display device according to claim 1, wherein the first dielectric layer further has at least a fourth through hole disposed corresponding to the driving electrode or the sensing electrode, and the electrostatic discharge layer contact with the driving electrode or the sensing electrode through the fourth through hole.

8. The touch display device according to claim 1, further comprising:
   a polarizing film disposed on the electrostatic discharge layer; and
   a pressure sensitive adhesive layer disposed between the electrostatic discharge layer and the polarizing film.

9. The touch display device according to claim 8, wherein the pressure sensitive adhesive layer is not doped with conductive material.

10. The touch display device according to claim 1, further comprising:
    a second substrate disposed opposite to the first substrate;
    a display layer disposed between the first substrate and the second substrate; and
    a polarizing film disposed on a surface of the first substrate away from the second substrate, wherein the electrostatic discharge layer is disposed between the polarizing film and the first substrate.

11. The touch display device according to claim 1, wherein a thickness of the electrostatic discharge layer is in a range from 100 angstroms (Å) to 30 microns (mm).

12. The touch display device according to claim 1, wherein a thickness of the first dielectric layer in a range from 700 angstroms (Å) to 6 microns (mm).

13. The touch display device according to claim 1, wherein a material of the electrostatic discharge layer includes an organic dielectric material doped with a conductive material, or an inorganic dielectric material doped with a conductive material.

14. The touch display device according to claim 1, wherein a material of the electrostatic discharge layer includes phosphorus-containing silicon oxide (SiOx:P), phosphorus-doped silicon nitride (SiNx:P), phosphorus-doped silicon oxy-nitride (SiOxNy:P), boron-doped silicon oxide (SiOx:B), boron-doped silicon nitride (SiNx:B), boron-doped silicon oxy-nitride (SiOxNy:B), antimony tin oxide (ATO), oxidation indium (InO), tin oxide (AnO), indium tin oxide (ITO), tin oxide (SnO), indium zinc oxide (IZO), indium gallium zinc oxide (IGZO), indium tin oxide zinc (ITZO), oxidation antimony zinc (AZO), poly (3,4-ethylenedioxythiophene) polystyrene sulfonate (PEDOT:PSS), carbon nanotube, nano silver wire or pressure sensitive rubber material doped with carbon nanotubes.

15. The touch display device according to claim 1, wherein the electrostatic discharge layer is formed by chemical vapor deposition (CVD), sputtering, resistor heating evaporation, electron beam evaporation, pulsed laser deposition or other suitable deposition methods, The chemical vapor deposition may be the low pressure chemical vapor deposition (LPCVD), low temperature chemical vapor deposition (LTCVD), rapid thermal chemical vapor deposition (RTCVD), plasma enhanced chemical vapor deposition (PECVD), atomic layer deposition (ALD) of atomic layer chemical vapor deposition.

* * * * *